Nov. 15, 1927.

T. E. WALES 1,649,628

METHOD OF MANUFACTURING FLUXED SOLDER IN WIRE FORM

Filed Jan. 8, 1925

Inventor.
Thomas E. Wales.
By Dewey, Strong, Townsend & Loftus
Attorneys.

Patented Nov. 15, 1927.

1,649,628

UNITED STATES PATENT OFFICE.

THOMAS E. WALES, OF SAN FRANCISCO, CALIFORNIA.

METHOD OF MANUFACTURING FLUXED SOLDER IN WIRE FORM.

Application filed January 8, 1925. Serial No. 1,292.

Fluxed solder in wire form is a more or less common article of manufacture. It is usually obtained by one of the following methods; for instance, by making the solder in tubular form and filling the interior of the tube with a fluxing material, or by making the solder in the form of a long thin strip, applying a fluxing material to one face thereof, pulling the strip lengthwise, and then twisting the folded strip to retain the fluxing material. In either instance, a wire form of fluxed solder is produced having a straight or twisted continuous passage formed therein to retain the flux. Both types have proved more or less unsatisfactory in actual practice, as the flux melts and runs out of the continuous passage when the solder becomes heated.

The object of the present invention is to provide a method of manufacturing fluxed solder in wire form or otherwise by which the fluxing material becomes sealed in a series of closely interspaced pockets formed within the solder, thereby preventing loss of the flux by melting and running out.

Two forms which the product may assume are illustrated in the accompanying drawings, in which—

Figure 1:
Fig. 1 is an enlarged view of a piece of wire solder without any fluxing material embodied therein.
Figure 2:
Fig. 2 is a cross-section of the wire solder shown in Fig. 1.
Figure 3:
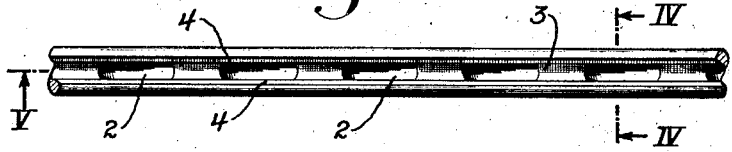
Fig. 3 shows the wire solder after pockets have been formed therein for the reception of the fluxing material.
Figure 4:
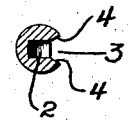
Fig. 4 is a cross-section, taken on line 4—4 of Fig. 3.
Figure 5:
Fig. 5 is a longitudinal section, taken on line 5—5 of Fig. 3.
Figure 6:
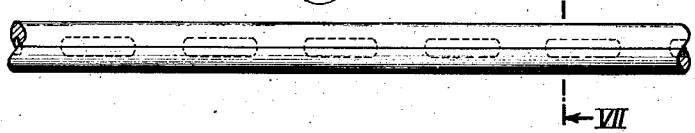
Fig. 6 is a plan view of the wire solder after the pockets have been sealed and closed.
Figure 7:
Fig. 7 is a cross-section, taken on line 7—7 of Fig. 6.

It has already been stated that ordinary fluxed wire solder, such as is commercially produced, is objectionable to the extent that the fluxing material is usually placed within a continuous passage formed in the wire solder and it is for this reason that it melts and runs out when the solder becomes heated. To prevent melting and running out of the flux, I have found that it is necessary to place the flux in a series of closely interspaced pockets, which are sealed so as to retain the flux and prevent it from melting and running out. This is accomplished as follows:

Solder of any suitable composition in wire form, such as shown in Figs. 1 and 2, is passed between a pair of rollers, one of which is grooved, while the other is provided with a toothed surface. When the wire is passed between these rollers, the teeth form a series of closely interspaced pockets in one side of the wire, as indicated at 2, and they also form a continuous groove such as shown at 3. After the wire has passed between the rollers, which may be termed impression rolls, it is next passed through a suitable form of machine which will fill the pockets with a fluxing material. After this, the wire is fed between a pair of closing rolls and this exerts sufficient pressure to bring the opposite faces 4 of the groove 3 into contact with each other, as shown in Figs. 6 and 7. This closing of the groove seals the pockets 2 and the fluxing material is thus completely embedded within the wire solder and is sealed in the pockets so that it will not melt and run out when the solder becomes heated.

Figure 8:
Fig. 8 is a perspective view showing the fluxed wire solder cut to form drop solder.
Figure 9:
Fig. 9 is an enlarged longitudinal section of Fig. 8.

The solder may be used in wire form, as shown in Figs. 6 and 7, or it may be cut into suitable lengths, such as shown in Figs. 8 and 9, thus producing what is commercially termed "drop solder". In either instance it will be seen that the fluxing material is contained in a sealed pocket within the solder and a sufficient amount of fluxing material is thus insured whenever the solder is used.

In view of the fact that a great variety of machines may be produced for forming the pockets in the wire, for filling the pockets with fluxing material, and for closing or sealing the pockets when filled, it is thought unnecessary to illustrate any particular form thereof, and while the pockets are here more or less specifically illustrated, it is obvious that any changes in form and proportion may be resorted to within the scope of the appended claims.

Having thus described my invention, what I claim and desire to secure by Letters Patent is—

1. A method of manufacturing fluxed solder in wire form, which consists in forming a series of closely interspaced pockets in one side of the wire throughout its length, filling the pockets with a fluxing material and crimping the other edges of the pockets together to seal the pockets.

2. A method of manufacturing fluxed solder in wire form, which consists in forming a groove in one side of the wire which extends from end to end, also forming a series of closely interspaced pockets in the wire which open into the groove, filling the pockets with a fluxing material, and sealing the pockets by pressing the opposite faces of the groove together.

THOMAS E. WALES.